US008618194B2

(12) United States Patent
Pfeil

(10) Patent No.: US 8,618,194 B2
(45) Date of Patent: Dec. 31, 2013

(54) RESIN MORTAR SUITABLE FOR CONSTRUCTION PURPOSES, ESPECIALLY FOR CHEMICAL ANCHORING

(75) Inventor: Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 296 days.

(21) Appl. No.: 13/024,573

(22) Filed: Feb. 10, 2011

(65) Prior Publication Data

US 2011/0201726 A1 Aug. 18, 2011

(30) Foreign Application Priority Data

Feb. 11, 2010 (EP) .................................... 10153243

(51) Int. Cl.
*C09J 163/00* (2006.01)
*C09J 11/02* (2006.01)
*C09J 4/00* (2006.01)

(52) U.S. Cl.
USPC ........... 523/456; 523/466; 523/458; 156/295; 156/330; 525/31; 525/528; 525/530; 525/531; 525/532

(58) Field of Classification Search
None
See application file for complete search history.

(56) References Cited

U.S. PATENT DOCUMENTS

| 4,426,243 | A | * | 1/1984 | Briggs | 156/307.3 |
| 5,612,394 | A | * | 3/1997 | Pfeil et al. | 523/403 |
| 6,815,517 | B2 | * | 11/2004 | Burgel et al. | 526/319 |
| 7,238,749 | B2 | * | 7/2007 | Buergel et al. | 525/257 |
| 2001/0018880 | A1 | * | 9/2001 | Pfeil et al. | 106/803 |
| 2004/0118514 | A1 | * | 6/2004 | Gosiewski et al. | 156/330 |
| 2005/0009995 | A1 | * | 1/2005 | Husemann et al. | 525/330.3 |
| 2006/0228545 | A1 | * | 10/2006 | Husemann et al. | 428/355 EP |
| 2009/0018231 | A1 | * | 1/2009 | Fink et al. | 522/96 |

FOREIGN PATENT DOCUMENTS

WO  WO 2008/057414 A1 * 5/2008

* cited by examiner

*Primary Examiner* — David Buttner
*Assistant Examiner* — Ha Nguyen
(74) *Attorney, Agent, or Firm* — Crowell & Moring LLP

(57) ABSTRACT

A resin mortar composition suitable for construction purposes is disclosed. The composition includes a resin component (A) curable with an aliphatic amine and a peroxide and a hardener component (H) with at least one peroxide (B) and at least one amine (C). At least one of the resin component (A) and the hardener component (H) contains at least one inorganic filler and the resin component (A) and the hardener component (H) or the resin composition (A) and the at least one peroxide (B) and the at least one amine (C) of the hardener component (H) are spatially separated from one another. The resin component (A) includes a compound (a) capable of undergoing a radical polymerization, a compound (b) capable of reacting with an amine, a transition metal compound (c), at least one inhibitor (d) to adjust the gel time and a bridging compound (e) having at least two reactive functionalities.

26 Claims, No Drawings

RESIN MORTAR SUITABLE FOR CONSTRUCTION PURPOSES, ESPECIALLY FOR CHEMICAL ANCHORING

This application claims the priority of European Patent Document No. 10153243.0, filed Feb. 11, 2010, the disclosure of which is expressly incorporated by reference herein.

BACKGROUND AND SUMMARY OF THE INVENTION

The present invention relates to a resin mortar composition suitable for construction purposes comprising a resin component (A) curable with an aliphatic amine and a peroxide; and a hardener component (H) comprising at least one peroxide (B) and at least one amine (C); wherein at least one of the resin component (A) and the hardener component (H) contains at least one inorganic filler; and wherein the resin component (A) and the hardener component (H) or the resin composition (A) and the at least one peroxi-de (B) and the at least one amine (C) of the hardener component (H) are spatially separated from one another to inhibit any reaction before mixing of the components, the use of the composition and cured structural objects obtained therewith.

To define the technical wording used within this document, a resin mortar comprises a curable resin, fillers and further additives to adjust reactivity and rheology of the mortar. Usually it is applied as a two-component system consisting of the filled resin in the first component, and the hardener in the second component. The application of the resin mortar requires mixing of resin- and hardener-components prior to its use.

The gel time defines the time of start of curing after mixing of resin- and hardener-components. It is required to delay the start of curing to ensure a sufficient working time for the user when applying the mortar, e.g., to enable him/her to insert and adjust a fastening element after injection of the mortar into a borehole.

The corresponding hybrid curing resin composition is used for obtaining an Interpenetrating Polymer Network IPN. As used herein, an Interpenetrating PolymerNetwork is a composition of at least two chemically distinct polymer networks that are at least partially interlaced on a molecular scale and that are optionally covalently bonded to each other. Besides true IPNs in which no covalent binding exists between the polymer networks, also semi IPNs can be formed. In a semi IPN, the two networks are covalently linked via a linking component which can react with the amine as well as can undergo a radical polymerisation. In case covalent binding is present between the polymer networks, the IPN is referred to as a semi IPN. In an IPN each network may retain its individual properties. As a result an improvement in properties can be attained as in an IPN the individual properties of at least two networks are combined.

In the article "Curing behaviour of IPNs formed from model VERs and epoxy systems I amine cured epoxy", K. Dean, W. D. Cook, M. D. Zipper, P. Burchill, Polymer 42 (2001), 1345-1359, it is described that one thermoset polymer network is formed by radical polymerization of vinyl ester resin dissolved in styrene with a radical initiator such as a peroxide. The other thermoset polymer network is formed by curing an epoxy compound with an amine by step growth copolymerization. The primary amine initially reacts with the epoxy group followed by the reaction of the secondary amine. It is also described that when cumene hydroperoxide, benzoyl peroxide or methyl ethyl ketone peroxide, with or without cobalt octoate, were used as the radical initiating systems, premature depletion of the initiator system occurs. The latter being disadvantageous for the radical curing. Furthermore the curing is effected at elevated temperatures, i.e., at least 75° C.

One of the more demanding structural applications for structural resin mortars is the chemical anchoring application, as in this application the mechanical strength, the adhesion to concrete and the adhesion to steel must be very good. A test for evaluating the mechanical strength, the adhesion to concrete and the adhesion to steel is the pull-out test. A low pull-out value represents a low tensile strength, low adhesion to metal and/or to concrete. In chemical anchoring applications, the pull-out values are preferably high under different circumstances, including under severe conditions such as low temperature circumstances (wintertime and/or high latitudes) as well as high temperature circumstances (summertime and/or low latitudes).

It has furthermore been found that the low temperature performance of resin systems, obtained upon adding an aliphatic amine and a peroxide as used in the above mentioned Cook reference, to a hybrid resin composition comprising (a) a radical curable resin selected from an unsaturated polyester resin or vinyl ester resin and (b) an epoxide resin, is poor.

The object of the invention is to improve the low temperature performance of such resin systems, and to provide appropriate resin mortars showing this increased low temperature performance especially in chemical anchoring applications.

It has been found that this can be achieved with the resin mortar composition referred to above, wherein the resin component (A) comprises a compound (a) capable of undergoing a radical polymerization, a compound (b) capable of reacting with an amine, a transition metal compound (c) selected from the group consisting of Cu, Mn and Fe compounds, at least one inhibitor (d) to adjust the gel time and a bridging compound (e) having at least two reactive functionalities, of which one functionality is capable of undergoing a radical (co)polymerization and one functionality is capable of reacting with an amine.

The subject-matter of the present invention therefore is a resin mortar composition suitable for construction purposes comprising a resin component (A) curable with an aliphatic amine and a peroxide; and a hardener component (H) comprising at least one peroxide (B) and at least one amine (C); wherein at least one of the resin component (A) and the hardener component (H) contains at least one inorganic filler; and wherein the resin component (A) and the hardener component (H) or the resin composition (A) and the at least one peroxide (B) and the at least one amine (C) of the hardener component (H) are spatially separated from one another to inhibit any reaction before mixing of the components. The resin component (A) comprises a compound (a) capable of undergoing a radical polymerization, a compound (b) capable of reacting with an amine, a transition metal compound (c) selected from the group consisting of Cu, Mn and Fe compounds, at least one inhibitor (d) to adjust the gel time and a bridging compound (e) having at least two reactive functionalities, of which one functionality is capable of undergoing a radical (co)polymerization and one functionality is capable of reacting with an amine.

The resin mortar composition is curable with the peroxide and the aliphatic amine, the curing is accelerated with the transition metal compound and the gel time is adjusted with the inhibitor and comprises additional fillers and additives. Upon curing, a cured hybrid resin mortar is obtained.

An additional advantage of the resin mortar composition according to the invention is that good curing can be obtained under several conditions, including low temperature conditions and high temperature conditions.

End segments where the resin compositions according to the present invention can be applied are chemical anchoring, but can also be used in further construction applications. As meant herein, chemical anchoring refers to chemical fastening of anchoring elements such as tie bars, dowels, rock bolts, screws, anchor rods in, for example, boreholes in concrete, natural and artificial rocks.

The resin component (A) of the resin mortar composition of the present invention preferably comprises a compound (a) capable of undergoing a radical polymerization an unsaturated polyester resin, a vinyl ester resin as more specifically defined below and a vinyl ester urethane resin, which can also be referred to as urethane methacrylate resin.

The compound (a) capable of undergoing radical polymerization is preferably an unsaturated polyester resin or a vinyl ester resin. Preferably, the resin composition comprises a vinal ester resin as radical curable compound. More preferably, the compound capable of undergoing radical polymerization is a vinyl ester resin.

The unsaturated polyester resin or vinyl ester resin used in the context of the present invention may be any such resin as is known to one of ordinary skill in the art. Examples thereof can be found in a review article of M. Malik, et al. in J. M. S.—Rev. Macromol. Chem. Phys., C40 (2&3), p. 139-165 (2000). The authors describe a classification of such resins— on the basis of their structure—in five groups:

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

(5) Vinyl ester resins: these are resins, which are mostly used because of their hydrolytic resistance and excellent mechanical properties, as well as for their low styrene emission; that have unsaturated sites only in the terminal position, introduced by reaction of epoxy resins (e.g., diglycidyl ether of bisphenol-A, epoxies of the phenolnovolac type, or epoxies based on tetrabromobisphenol-A) with (meth)acrylic acid. Instead of (meth)acrylic acid also (meth)acrylamide may be used.

Besides the vinyl ester resins as described in Malik, et al., also the class of vinyl ester urethane resins (also referred to urethane methacylate resins) can be distinguished.

The compound (a) capable of undergoing radical polymerization preferably has a molecular weight of at least 200 Dalton, more preferably of at least 300 Dalton and even more preferably of at least 500 Dalton. The compound capable of undergoing radical polymerization preferably has a molecular weight of at most 10,000 Dalton and more preferably at most 5000 Dalton.

The compound (a) capable of undergoing radical polymerization preferably has an acid value as low as possible in order to prevent salt formation of the radical polymerisable compound with the amine. The compound (a) capable of undergoing radical polymerization preferably has an acid value of at most 60, more preferably of at most 40, more preferably of at most 10, even more preferably of at most 5 and even more preferably 0. In view of this, a vinyl ester resin is preferably applied as compound (a) capable of undergoing radical polymerization.

The resin composition preferably comprises an epoxide functional resin as compound (b) capable of reacting with an amine. The compound (b) capable of reacting with an amine and epoxide functional resin, which oxide functional resin more preferably comprises as the epoxide function a glycidyl ether function. More preferably, the compound (b) capable of reacting with an amine is preferably an epoxide functional resin, i.e., a resin containing at least one epoxide group. Most preferably, the epoxide functionality is a glycidyl ether.

The compound (b) capable of reacting with an amine preferably has a molecular weight of at least 300 Dalton, more preferably of at least 500 Dalton and even more preferably of at least 750 Dalton. The compound capable of reacting with an amine preferably has a molecular weight of at most 10,000 Dalton and more preferably of at most 5000 Dalton.

The resin composition comprises as the Cu, Mn or Fe compound (c), preferably a salt or complex of the transition metals. The Cu, Mn or Fe compound is preferably a Cu, Mn or Fe carboxylate, more preferably a $C_1$-$C_{30}$ carboxylate and even more preferably a $C_1$-$C_{16}$ carboxylate. Most preferably, the resin composition comprises a Cu compound and/or a Mn compound as transition metal compound (c).

As is known in the art, storage stabilizers (in the art often referred to as polymerisation inhibitors) are usually present in curable resin compositions for preventing premature gelation, i.e., to guarantee a shelf life. Besides this effect on storage stability, inhibitors (d) can also be used to tune the gel time of the curing upon addition of the curing agent. Generally, as inhibitors consume radicals, all inhibitors retard the polymerisation, i.e., prolongs the gel time of the curing upon addition of the curing agent.

It has now surprisingly been found that only stable oxyl radicals are able to prolonge the gel time of the curing, upon addition of an aliphatic amine and a peroxide, of resin compositions comprising a compound capable of undergoing a radical polymerization and a compound capable of reacting with an amine.

Using a phenolic compound or a dihydroxy aromatic compound, which are frequently applied as storage stabilizers for methacrylates, does not give the desired inhibiting effect on the curing rate. In particular, phenolic compounds, like for example BHT (2,6-di-t.butyl-4-methyl-phenol) and p-methoxy phenol, surprisingly hardly influence the gel time, while dihydroxy aromatic compounds, like for example the hydroquinones and the catechols, surprisingly accelerates the curing instead of inhibiting the curing.

The resin composition according to the invention thus further comprises a stable (at room temperature) oxyl radical inhibitor as polymerization inhibitor (d). As used herein, a polymerization inhibitor is a compound that delays the start of curing, upon addition of a peroxide and an aliphatic amine, of a composition comprising a compound capable of undergoing a radical polymerization and a compound capable of reacting with an amine, and thus prolongs the gel time.

The stable oxyl radical is preferably selected from the group of stable N-oxyl radicals according to the following formula

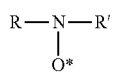

in which R and R' are the same or different $C_1$-$C_{20}$ alkyl or $C_7$-$C_{20}$ alkylaryl, R and R' may be part of a cycloalkyl group. Preferably, R and R' are the same or different $C_1$-$C_{20}$ alkyl, more preferably tert.alkyl.

According to the present invention, the start of curing, upon addition of a peroxide and an aliphatic amine, of the composition comprising a compound (a) capable of undergoing a radical polymerization and a compound (b) capable of reacting with an amine, is delayed by effecting the curing in the presence of the stable oxyl radical inhibitor (d). One of ordinary skill in the art will be able to determine a suitable amount of such stable oxyl radical as is to be used for achieving a desired reduction of the curing rate.

The resin component (A) of the resin mortar composition of the present invention comprises compound (a) and compound (b) as two separate compounds and further comprises a bridging compound (e) having at least two reactive functionalities, of which one functionality is capable of undergoing a radical (co)polymerization and one functionality is capable of reacting with an amine. It has been found that presence of such a bridging compound (e) results in that the low temperature performance is even more improved.

Preferably, the bridging compound (e) contains a radical curable functionality selected from acrylate, methacrylate, vinyl ether, vinyl ester and allyl ether functionality, more preferably a methacrylate or acrylate and even more preferably a methacrylate functionality. More preferably, the radical curable functionality of the bridging compound (e) is selected from acrylate, methacrylate, vinyl ether, vinyl ester and allyl ether functionalities, more preferably is a methacrylate or acrylate and even more preferably is a methacrylate functionality.

Preferably, the bridging compound (e) contains an isocyanate, an epoxide or a cyclic carbonate as functionality capable of reacting with an amine, more preferably an epoxide and even more preferably a glycidyl ether. More preferably, the functionality of the bridging component (e) capable of reacting with an amine is selected from an isocyanate-, a epoxide-, a cyclic carbonate-, acetoacetoxy- and oxalic-amide-functionality, more preferably is an epoxide and even more preferably is a glycidyl ether functionality.

In a preferred embodiment, the radical (co)polymerizable functionality of the bridging compound is a methacrylate and the amine reactive functionality is an epoxide functionality.

Preferably, the molecular weight Mn of the bridging compound is less than 400 Dalton as this results in that the low temperature performance is even more improved, more preferably less than 350 Dalton, even more preferably less than 300 Dalton and even more preferably less than 250 Dalton.

In a preferred embodiment, the resin composition comprises glycidylmethacrylate as bridging compound (e). In a more preferred embodiment, the bridging compound (e) is glycidylmethacrylate.

The molar ratio of radical polymerizable functionalities and the functionalities capable of reacting with an amine is preferably from 10:1 to 1:10, more preferably from 5:1 to 1:5 and even more preferably from 3:1 to 1:3.

The resin mortar composition comprises as the peroxide (B) an organic or inorganic peroxide, whether solid or liquid. Preferably the peroxide (B) is selected from hydroperoxides, perethers, peresters, peranhydrides and percarbonates, more preferably peroxybenzoates and most preferably tert-butyl-peroxybenzoate.

The amine (C) used to cure compound (b) capable of reacting with an amine preferably is a primary and/or secondary aliphatic amine or an aliphatic or araliphatic polyamine. Preferably, at least a primary aliphatic amine is used to cure compound (b). More preferably, a primary aliphatic amine as well a secondary aliphatic amine is used to cure compound (b). The polyamine is distinguished by the fact that it preferably carries at least two primary aliphatic amino groups. It can also carry further amino groups having a primary, secondary or tertiary character. Furthermore, polyaminoamides and polyalkylene oxide-polyamines or amine adducts, such as amine-epoxy resin adducts or Mannich bases, are also suitable.

Examples of suitable aliphatic and araliphatic polyamines are: 1,2-diaminoethane, 1,2-diaminopropane, 1,3-diaminopropane, 1,4-diaminobutane and higher homologues, as well as 2-methyl-1,5-diaminopentane, 1,3-diaminopentane, 2,2,4-trimethyl-1,6-diaminohexane, 2,4,4-trimethyl-1,6-diaminohexane, 1-amino-3-aminomethyl-3,5,5-trimethylcyclohexane, 2,2-dimethyl-1,1,3-diaminopropane, 1,3-bis(aminomethyl)cyclohexane, 1,2-diaminocyclohexane, 1,3-bis(aminomethyl)benzene, bis(4-aminocyclohexyl)methane, bis(4-amino-3-methylcyclohexyl)methane, 3-azapentane-1,5-diamine, 4-azaheptane-1,7-diamine, 3,6-diazoctane-1,8-diamine, 3(4),8(9)-bis(aminomethyl) tricyclo[5.2.1.0$^{2,6}$]-decane, 3-methyl-3-azapentane-1,5-diamine, linear or branched polyalkylenoxide polyamines with at least one, preferably more than one primary and secondary aliphatic amino groups (e.g., like the Jeffamine types from Huntsman Corporation, preferably Jeffamine D-230, Jeffamine D-400, Jeffamine T-403) and 2-butyl-2-ethyl-1,1,5-diaminopentane.

According to the present invention, the resin component (A) and/or the hardener component (H) contain at least one inorganic filler selected from the group consisting of quartz, glass, corundum, porcelain, stoneware, light spar, heavy spar, gypsum, talcum, chalk or mixtures thereof, these fillers being contained in the form of sands, flours or molded objects, especially in the form of fibers or spheres.

In another embodiment, the resin composition according to the invention comprises the stable N-oxyl radical inhibitor (d) and additionally a dihydroxy benzene compound. Examples of suitable dihydroxy benzene compounds are hydroquinones, catechols and resorcinols. In this embodiment of the invention, the curing rate, upon addition of a peroxide and an aliphatic amine, of resin compositions comprising a compound capable of undergoing a radical polymerization and a compound capable of reacting with an amine, can be tuned by effecting the curing in the presence of a stable oxyl radical and a dihydroxy benzene compound. The curing rate can be tuned as desired by selecting appropriate amounts of the stable oxyl radical and of the dihydroxybenzene compound. One of ordinary skill in the art will be able to determine appropriate amounts of such stable oxyl radical and dihydroxy benzene compound as is to be used for achieving the desired tuning effect of the curing rate. Preferred dihydroxy benzene compounds are 1,2- and 1,4-dihydroxybenzene compounds, which compounds optionally further contain other substituents on the benzene group.

It has further surprisingly been found that the presence of a stable oxyl radical as well as a dihydroxy benzene compound in the resin composition according to the invention results in a synergetic effect on pull out performance.

In a preferred embodiment, the resin composition further comprises a reactive diluent. The diluent, for instance, will be applied for adjustment of the viscosity of the resin composition in order to make handling thereof more easy. Moreover, adjustment of cross-linking in the cured products may be achieved if the diluent contains groups that are reactive with the reactive moieties in the resin. In such case, the diluent is called a reactive diluent. A reactive diluent may contain all kinds of such reactive groups, but the groups may also be identical to reactive moieties in the resin.

Preferably, at least part of the reactive diluent is capable of a radical (co)polymerization. Examples of suitable monomers are, for instance, alkenyl aromatic monomer, such as for example styrene, styrene derivatives and divinylbenzene, (meth)acrylates, vinyl ethers and vinyl amides but all other reactive monomers for use in the field of thermosetting resins as are known to one of ordinary skill in the art can be used. Preferred monomers are styrene, alpha-methyl styrene, chlorostyrene, vinyl toluene, divinyl benzene, methyl methacrylate, tert.butyl styrene, tert.butylacrylate, butanediol dimethacrylate and mixtures thereof. Suitable examples of (meth)acrylates reactive diluents are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethylene glycol di(meth)acrylate, glycerol di(meth)acrylate, trimethylolpropane di(meth)acrylate, neopentyl glycol di(meth)acrylate, dipropylene glycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate and trimethylolpropanetri (meth)acrylate. Preferably, a (meth)acrylate is used as reactive diluent.

Preferably, at least part of the reactive diluent is capable of reacting with an amine. More preferably, at least part of the reactive diluent is capable of both reacting with an amine as well as being capable of radical (co)polymerization in which case a semi IPN will be formed.

The resin composition preferably further comprises a storage stabilizer in order to further improve its storage stability. Preferably, the storage stabilizer is selected from the group of stable radicals, phenolic compounds, hydroquinones, catechols and phenothiazines. Suitable examples of storage stabilizers that can be used for improving the storage stability of the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), galvinoxyl, aluminium-N-nitrosophenyl hydroxylamine, diethylhydroxylamine, phenothiazine and/or derivatives or combinations of any of these compounds.

To adjust the viscosity and flow behavior of the mortar components, further additives like fumed silica, polymeric thickening agents, clays and the like can be incorporated in either one or any of the components.

The present invention thus relates to a multicomponent system comprising at least two components, i.e., the resin component (A) as described above and the hardener component (H) comprising the peroxide (B) and the aliphatic amine (C). In another embodiment, the multicomponent system is a three component system consisting of the resin component (A) as described above, the peroxide (B) and the amine (C). The peroxide is preferably a perester or a monopercarbonate. The aliphatic amine is preferably a primary and/or secondary aliphatic amine.

According to a preferred embodiment of the present invention, the resin mortar composition is contained in a cartridge, a container, a capsule or a film bag which comprises two or more chambers, which are separated from one another and in which the resin component (A) and the hardener component (H), or the resin component (A) and the at least one peroxide (B) and the at least one amine (C) of the hardener component (H) respectively, are contained separated from one another to inhibit any reaction.

The present invention also relates to the use of the above defined resin mortar composition for construction purposes comprising curing the composition by mixing the resin component (A) with the hardener component (H) or the resin composition (A) and the at least one peroxide (B) and the at least one amine (C) of the hardener component (H).

More preferably the resin mortar composition of the present invention is used for fastening of threaded anchor rods, reinforcing irons, threaded sleeves and screws in boreholes of any kind of substrate comprising mixing the resin component (A) with the hardener component (H) or the resin component (A) and the at least one peroxide (B) and the at least one amine (C) of the hardener component (H), inserting the mixture into the boreholes, introducing the threaded anchor rods, reinforcing irons, threaded sleeves and screws into the mixture in the boreholes and curing the mixture.

In case the peroxide (B) and the aliphatic amine (C) are separately mixed into the resin component (A), in which embodiment use is preferably made of a three component resin system as described above, the aliphatic amine (C) is preferably first added to the resin component (A), followed by adding the peroxide (B). In another embodiment, the amine (C) and the peroxide (B) are first mixed (giving component B) and the resulting mixture is mixed into the resin component (A) according to the invention. In this embodiment, use is preferably made of a two component system as described above.

Curing of the resin mortar composition according to the invention is preferably effected at a temperature in the range of from −20 to +200° C., preferably in the range of from −20 to +100° C., and most preferably in the range of from −10 to +60° C. (so-called cold curing).

In a preferred embodiment, the curing of the resin mortar composition is effected with a primary aliphatic amine and/or a secondary aliphatic amine and with a perester.

Further subject-matter of the present invention are the cured structural objects obtained by curing the above-defined resin mortar composition or obtained by the use as defined above.

The present invention further relates to the use of the cured objects in anyone of the areas of construction, especially of chemical anchoring.

DESCRIPTION OF EXEMPLARY EMBODIMENTS

The invention is now demonstrated by a series of examples and comparative examples. All examples are supportive of the scope of claims. The invention, however, is not restricted to the specific embodiments as shown in the examples.

Gel-Time

The gel time of the mixture, obtained in this way from the resin component (A) and the hardener component (H) of the two-component reaction resin, is determined with a conventional commercial device (gel timer) at a temperature of 25° C. and at 40° C. For this purpose, the components (A) and (H) are brought in a 3:1 ratio by volume into a test tube up to about 4 cm below the rim, the tests tube being maintained at a temperature of 25° C. or 40° C. (DIN 16945, DIN EIN ISO 9396). A glass rod or a spindle is moved up and down in the resin with 10 lifts per minute. The gel time is the time at which the test tube is lifted by the oscillating rod. Random tests showed that the degree of curing at the gel point (measured by differential scanning calorimetry (DSC)) is constant within the accuracy of the measurement.

Bond-Strengths

For determining the load values of the cured composition, a threaded M12 anchor rod is used, which is doweled with the inventive two-component resin mortar into a concrete borehole with a diameter of 14 mm and a depth of 72 mm. The average failure load is determined by pulling out the threaded anchor rod centrally with a narrow confinement using high-strength threaded anchors. In each case, 3 threaded anchor rods are doweled in and their load values are generally determined after 24 hours of curing. The load values, so obtained, are also listed as average values (kN).

Different bore-hole conditions and/or curing conditions were tested, see below. Bond strengths (N/mm$^2$) are obtained from the load values by dividing the load value by the bonded surface of the threaded anchor rod.

| Test condition | Remark |
| --- | --- |
| Reference | Well cleaned, dry hammer-drilled hole, curing at room temperature |
| −5° C. | Reference holes, but installation and curing at base material temperature −5° C. |
| +40° C. | Reference holes, but installation and curing at base material temperature +40° C. |
| Inserv +50° C. | Installation like "reference", after 24 h curing at room temp heating up to 50° C., pull-out after another 24 h at 50° C. |
| Inserv +80° C. | Like 50° C., but after 24 h/50° C. heating up to 80° C., pull-out at 80° C. after 24 h |

Resin Mixture A

A resin formulation was prepared by mixing 1.93 kg bisphenol A glycerolate dimethacrylate (compound (a)), 5.14 kg bisphenol A diglycidylether (compound (b)), 1.28 kg butanediol dimethacrylate BDDMA (inhibitor (d)), and 1.61 kg glycidylmethacrylate (bridging agent (e)).

Comparative Resin Mixture B (without Bridging Agent (e))

A resin formulation was prepared by mixing 1.93 kg bisphenol A glycerolate dimethacrylate, 5.14 kg bisphenol A diglycidylether, and 2.89 kg butanediol dimethacrylate BDDMA Raw Materials for Mortar Preparation

| Raw Material | Comment |
| --- | --- |
| Cu-solution | Cu-naphthenate 8 wt-% in white spirits (transition metal compound (c)) |
| Tempol | 1-oxyl-2,2,6,6-tetramethylpiperidine-4-ol (inhibitor (d)) |
| Quarz sand | Medium particle size 0.4 mm, max particle size 0.7 mm |
| Quarz flour | Particle size below 50 µm |
| Aerosil R202 | Fumed silica |
| Dytek A | 2-Methylpentamethylenediamine |
| Trigonox C | tert-Butyl peroxybenzoate |

EXAMPLE 1-2 AND COMPARATIVE EXAMPLE

Final formulations were prepared as listed in the table below:

|  | Inventive example 1 | Inventive example 2 (more Cu) | Comparative Example (no bridging agent) |
| --- | --- | --- | --- |
| Component A | | Grams | |
| Resin A | 45.00 | 45.00 | |
| Comparative Resin B | | | 45.00 |
| Cu-solution | 0.18 | 0.36 | 0.18 |
| Tempol | 30 ppm | 30 ppm | 30 ppm |
| Quarz sand | 34.70 | 34.70 | 34.70 |
| Quarz flour | 19.12 | 19.12 | 19.12 |
| R202 | 2.00 | 2.00 | 2.00 |
| Component B | | Grams | |
| Dytek A | | 6.00 | 4.43 |
| Trigonox C | | 1.00 | 0.72 |
| Quarz flour | | 7.00 | 5.50 |
| R202 | | 0.84 | 0.84 |
| Gel-times | | mm:ss | |
| @ 25° C. | 20:00 | | |
| @ 40° C. | 7:30 | | |
| Bond Strengths | | N/mm$^2$ | |
| Ref | 28.2 | 30.0 | 27.1 |
| −5° C. | 20.0 | 23.2 | 12.0 |
| +40° C. | 32.1 | 28.2 | 25.0 |
| Inserv +50° C. | 27.8 | 27.8 | 23.2 |
| Inserv +80° C. | 26.2 | 21.0 | 17.5 |

CONCLUSIONS

The above data show that:
- the inventive resin mortar compositions achieve a very high bond strength level like classical epoxy-amine mortars;
- the inventive resin mortar compositions show fast curing at low temperatures, where classical epoxy-amine systems fail or are very slow;
- nevertheless they exhibit longer gel-times=working times than the fast curing methacrylate systems;
- the inventive systems show a significantly improved heat resistance compared to classical epoxy-amine systems; and
- the presence of a bridging agent provides considerable improvement especially for the low temperature performance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalent thereof.

What is claimed is:

1. A resin mortar composition, comprising:
a resin component (A) curable with an aliphatic amine and a peroxide; and
a hardener component (H) comprising at least one peroxide (B) and at least one amine (C);
wherein at least one of the resin component (A) and the hardener component (H) contains at least one inorganic filler;
wherein the resin component (A) and the hardener component (H) or the resin composition (A) and the at least one peroxide (B) and the at least one amine (C) of the hardener component (H) are spatially separated from one another to inhibit any reaction before mixing of the components;
and wherein the resin component (A) comprises a compound (a) capable of undergoing a radical polymerization, a compound (b) capable of reacting with an amine, a transition metal compound (c) selected from the group consisting of Cu, Mn and Fe compounds, at least one inhibitor (d) to adjust the gel time and a bridging compound (e) having at least two reactive functionalities, of which one functionality is capable of undergoing a radical (co)polymerization and one functionality is capable of reacting with an amine.

2. The resin mortar composition according to claim 1, wherein the compound (a) capable of undergoing a radical polymerization is an unsaturated poly-ester resin, a vinyl ester resin and/or a vinylester urethane resin.

3. The resin mortar composition according to claim 1, wherein the compound (b) capable of reacting with an amine is an epoxide functional resin.

4. The resin mortar composition according to claim 3, wherein the epoxide function of the epoxide functional resin is a glycidyl ether function.

5. The resin mortar composition according to claim 1, wherein the inhibitor (d) is a stable oxyl radical inhibitor.

6. The resin mortar composition according to claim 5, wherein the stable oxyl radical inhibitor is selected from the group of stable N-oxyl radicals according to the following formula:

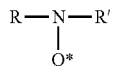

in which R and R' are the same or different $C_1$-$C_{20}$ alkyl or $C_7$-$C_{20}$ alkylaryl, wherein R and R' may be part of a cycloalkyl group.

7. The resin mortar composition according to claim 6, wherein the stable oxyl radical inhibitor is selected from the group consisting of comprising of 1-oxyl-2,2,6,6-tetramethylpiperidine, 1-oxyl-2,2,6,6-tetramethylpiperidine-4-ol (TEMPOL), 1-oxyl-2,2,6,6-tetramethylpiperidine-4-one (TEMPON), 1-oxyl-2,2,6,6-tetramethyl-4-carboxyl-piperidine (4-carboxy-TEMPO), 1-oxyl-2,2,5,5-tetramethylpyrrolidine, 1-oxyl-2,2,5,5-tetramethyl-3-carboxylpyrrolidine (3-carboxy-PROXYL), gal-vinoxyl and derivatives or combinations thereof.

8. The resin mortar composition according to claim 1, characterized in that the bridging compound (e) contains a radical curable functionality selected from the group consisting of an acrylate-, methacrylate-, vinylether-, vinylester- and allylether-functionality and a functionality capable of reacting with an amine selected from the group consisting of isocyanate-, epoxide-, cyclic-carbonate-, acetoacetoxy- and oxalic-amide-functionality.

9. The resin mortar composition according to claim 8, wherein the radical (co)polymerizable functionality of the bridging compound (e) is a methacrylate-functionality and the amine reactive functionality is an epoxide-functionality.

10. The resin mortar composition according to claim 1, wherein the bridging compound (e) has a number average molecular weight Mn lower than 400 Dalton.

11. The resin mortar composition according to claim 1, wherein the molar ratio of radical polymerizable functionalities and the functionalities capable of reacting with an amine of the bridging compound (e) is from 10:1 to 1:10.

12. The resin mortar composition according to claim 1, wherein the bridging compound (e) is glycidylmethacrylate.

13. The resin mortar composition according to claim 1, wherein the peroxide (B) is selected from the group consisting of hydroperoxides, perethers, peresters, peranhydrides and percarbonates.

14. The resin mortar composition according to claim 1, wherein the amine (C) is selected from the group consisting of aliphatic amines, aliphatic polyamines, and araliphatic polyamines.

15. The resin mortar composition according to claim 14, wherein the aliphatic and araliphatic polyamine (C) is selected from the group consisting of 1,2-diaminoethane, 1,2-diaminopropane, 1,3-diaminopropane, 1,4-diaminobutane and higher homologues, as well as 2-methyl-1,5-diaminopentane, 1,3-diaminopentane, 2,2,4-trimethyl-1,6-diaminohexane, 2,4,4-trimethyl-1,6-diaminohexane, 1-amino-3-aminomethyl-3,5,5-trimethylcyclohexane, 2,2-dimethyl-1,1,3-diaminopropane, 1,3-bis(aminomethyl)cyclohexane, 1,2-diaminocyclohexane, 1,3-bis(aminomethyl)benzene, bis(4-aminocyclohexyl)methane, bis(4-amino-3-methylcyclohexyl)methane, 3-azapentane-1,5-diamine, 4-azaheptane-1,7-diamine, 3,6-diazoctane-1,8-diamine, 3(4), 8(9)-bis(aminomethyl) tricyclo[5.2.1.02,6]-decane, 3-methyl-3-azapentane-1,5-diamine and 2-butyl-2-ethyl-1,1,5-diaminopentane.

16. The resin mortar composition according to claim 1, wherein the resin component (A) and/or the hardener component (H) contain at least one inorganic filler selected from the group consisting of quartz, glass, corundum, porcelain, stone ware, light spar, heavy spar, gypsum, talcum, chalk or mixtures thereof, these fillers being contained in a form of sands, flours and molded objects.

17. The resin mortar composition according to claim 1, wherein the resin component (A) comprises as an additional inhibitor a dihydroxy benzene compound selected from the group consisting of hydroquinones, catechols and resorcinols.

18. The resin mortar composition according to claim 1, wherein the resin component (A) comprises a reactive diluent.

19. The resin mortar composition according to claim 18, wherein at least part of the reactive diluent is capable of a radical (co)polymerization and/or capable of reacting with an amine.

20. The resin mortar composition according to claim 19, wherein the reactive diluent is selected from the group consisting of styrene, styrene derivatives, divinylbenzene, (meth) acrylates, vinyl ethers and vinyl amides.

21. The resin mortar composition according to claim 20, wherein the reactive diluent is selected from the group consisting of alpha-methyl styrene, chlorostyrene, vinyl toluene, divinyl benzene, methyl methacrylate, tert.butyl styrene, tert.butylacrylate, butanediol dimethacrylate, PEG200 di(meth) acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethylene glycol di(meth)acrylate, glycerol di(meth)acrylate, trimethylolpropane di(meth)acrylate, neopentyl glycol di(meth)acrylate, dipropylene glycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylolpropanetri(meth) acrylate and mixtures thereof.

22. The resin mortar composition according to claim 1, wherein the composition is contained in a cartridge, a container, a capsule or a film bag, which comprises two or more chambers, which are separated from one another and in which the resin component (A) and the hardener component (H), or the resin component (A) and the at least one peroxide (B) and the at least one amine (C) of the hardener component (H) respectively, are contained separated from one another to inhibit any reaction.

23. A method of using the resin mortar composition according to claim 1 for a construction purpose comprising curing the composition by mixing the resin component (A) with the hardener component (H) or the resin composition (A) and the at least one peroxide (B) and the at least one amine (C) of the hardener component (H).

24. A method of using the resin mortar composition according to claim 1 for fastening of a threaded anchor rod, a reinforcing iron, or a threaded sleeve in a borehole of a substrate comprising mixing the resin component (A) with the hardener component (H) or the resin component (A) and the at least one peroxide (B) and the at least one amine (C) of the hardener component (H), inserting the mixture into the borehole, introducing the threaded anchor rod, the reinforcing iron, or the threaded sleeve into the mixture in the borehole and curing the mixture.

25. The method of using the resin mortar composition according to claim 23, wherein the curing is effected at a temperature in a range of from −20 to +200° C.

26. A cured structural object obtained by curing the resin mortar composition according to claim 1 or obtained by the method of using the resin mortar composition according to claim 23 or claim 24.

* * * * *